United States Patent Office 3,650,945
Patented Mar. 21, 1972

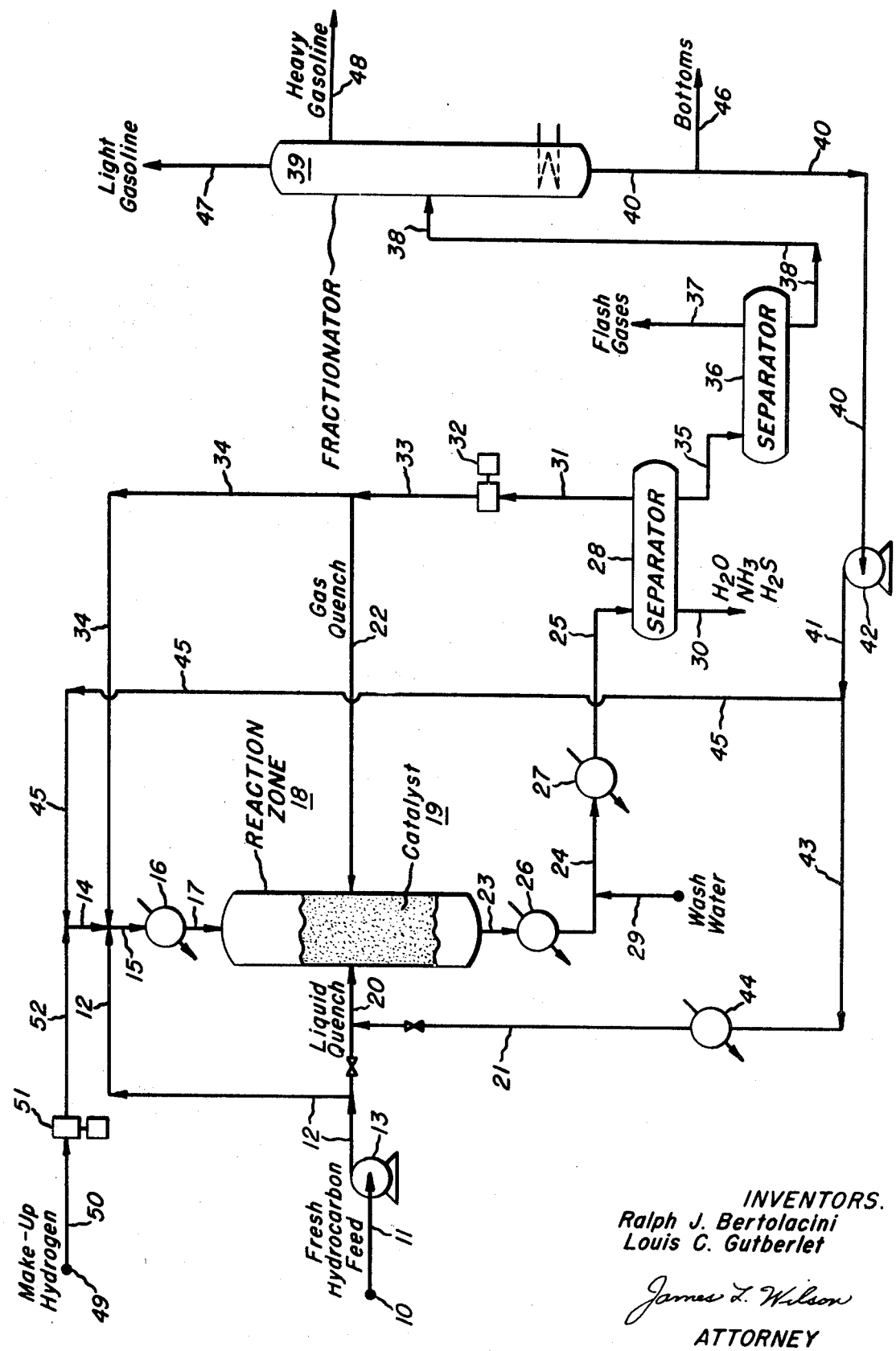

3,650,945
URANIUM-CONTAINING AND ALUMINOSILI-
CATE-CONTAINING HYDROCARBON CON-
VERSION CATALYST AND PROCESS
Ralph J. Bertolacini, Chesterton, and Louis C. Gutberlet, Crown Point, Ind., assignors to Standard Oil Company, Chicago, Ill.
Continuation-in-part of application Ser. No. 749,838, Aug. 2, 1968. This application Jan. 28, 1969, Ser. No. 794,731
Int. Cl. C10g 13/04
U.S. Cl. 208—111     19 Claims

ABSTRACT OF THE DISCLOSURE

The catalyst comprises a hydrogenation component and a cocatalytic acidic cracking support. The hydrogenation component comprises a member selected from the group consisting of (1) uranium and a Group VI–B metal of the Periodic Table of Elements; (2) a Group VI–B metal and a Group VIII metal of the Periodic Table of Elements; (3) uranium, a Group VI–B metal, and a Group VIII metal; (4) their oxides; (5) their sulfides; and (6) mixtures of the metals, their oxides, and their sulfides. The acidic cracking support comprises a large-pore crystalline aluminosilicate material and a silica-alumina cracking catalyst, the large-pore crystalline aluminosilicate material being a member selected from the group consisting of uranium-exchanged X-type aluminosilicate material, uranium-exchanged Y-type aluminosilicate material, uranium-exchanged L-type aluminosilicate material, and ultrastable, large-pore crystalline aluminosilicate material. The catalyst is characterized by the presence of at least some uranium in its composite.

The process comprises contacting petroleum hydrocarbons with the catalyst of the invention under hydrocarbon conversion conditions.

CROSS-REFERENCE TO RELATED APPLICATION

This is a continuation-in-part application of application Ser. No. 749,838, filed Aug. 2, 1968, and now abandoned.

BACKGROUND OF THE INVENTION

The present invention pertains to a catalytic composition and to hydrocarbon conversion processes which employ that catalytic composition. The catalytic composition comprises a hydrogenation component and an acidic cracking component and is characterized by the presence of uranium and a large-pore crystalline aluminosilicate material. The hydrocarbon conversion processes are processes for treating mineral oils which result in a chemical alteration of at least some of the hydrocarbon molecules of the mineral oils to form mineral oils having different properties.

Patents which appear to be pertinent to the present invention include Riedl, U.S. 2,739,132, Mabry et al., U.S. 2,817,626; and Hansford, U.S. 3,159,569.

The Riedl patent is directed to a catalyst comprising alumina and uranium oxide and its method of manufacture. This catalytic composition does not contain a large-pore crystalline aluminosilicate material.

The Mabry et al., patent is directed to a catalyst that comprises a minor proportion of iron oxide and a minor proportion of at least one oxide of a group of metal oxides, one of which is the oxide of uranium, deposited on a support. This catalyst is not the same as the catalyst of the present invention, since the catalyst of this reference contains iron oxide and does not contain large-pore crystalline aluminosilicate material.

The Hansford patent considers a catalyst which comprises a base consisting essentially of titania xerogel, zirconia xerogel, and silica xerogel and an added promoter which may be tungsten-uranium, and their oxides and sulfides. This particular catalyst does not employ the acidic cracking component that is used in the present invention. It does not contain a large-pore crystalline aluminosilicate material.

Not one of these patents teaches, discloses, or even suggests, the catalytic composition or processes of the present invention.

SUMMARY OF THE INVENTION

Briefly, in accordance with the invention, there is provided a catalytic composition for the conversion of petroleum hydrocarbons. This catalytic composition comprises a hydrogenation component on a co-catalytic acidic cracking support. The hydrogenation component comprises a member selected from the group consisting of (1) uranium and a Group VI–B metal of the Periodic Table of Elements; (2) a Group VI–B metal and a Group VIII metal of the Periodic Table of Elements; (3) uranium, a Group VI–B metal, and a Group VIII metal; (4) their oxides; (5) their sulfides; and (6) mixtures of the metals, their oxides, and their sulfides. Uranium and the Group VI–B metal are present in a combined amount within the range of about 1 weight percent to about 25 weight percent, based upon the total weight of catalyst, the uranium being calculated as $UO_2$ and the Group VI–B metal being calculated as its oxide. If the catalyst contains a Group VIII metal, the Group VIII metal is present in an amount within the range of about 1 weight percent to about 10 weight percent, based upon the total weight of catalyst, and calculated as its oxide. The preferred Group VI–B metal is molybdenum and the preferred Group VIII metals are nickel and cobalt.

The acidic cracking support comprises a large-pore crystalline aluminosilicate material and a silica-alumina cracking catalyst. The large-pore crystalline aluminosilicate material is present in an amount within the range of about 5 weight percent to about 50 weight percent, based upon the weight of the cracking support. The large-pore crystalline aluminosilicate material is a member selected from the group consisting of uranium-exchanged X-type aluminosilicate material, uranium-exchanged Y-type aluminosilicate material, uranium-exchanged L-type aluminosilicate material, and ultrastable, large-pore crystalline aluminosilicate material.

The catalytic composition of this invention is characterized by the presence of at least some uranium in its composite.

The hydrocarbon conversion processes of this invention include processes for converting mineral oils which boil above about 350° F. Such mineral oils may contain a substantial amount of cyclic hydrocarbons and a substantial amount of nitrogen-containing compounds. The processes comprise contacting the petroleum hydrocarbon fraction with the catalytic composition of this invention in the presence of a hydrogen-affording gas under hydrocarbon conversion conditions. A process for the hydrocracking of gas oils to lower-boiling products and a process for the disproportionation of aromatics are examples of the processes of this invention. A suitable example of a process for the disproportionation of aromatics is a process for the disproportionation of toluene to form benzene and xylenes.

BRIEF DESCRIPTION OF THE DRAWING

The accompanying drawing is a highly-simplified schematic flow diagram of a preferred embodiment of a process of this invention. In this case, the process is a process for the hydrocracking of petroleum hydrocarbons. Certain auxiliary equipment, such as some valves, pumps, and the like, are not shown, but would be recognized easily by those skilled in the art to be employed at selected points along the flow path of the process.

DESCRIPTION AND PREFERRED EMBODIMENTS

Among the more important processes for the conversion of petroleum hydrocarbon fractions are those in which higher-octane materials are produced. Two such processes are catalytic reforming and hydrocracking.

Hydrocracking is a general term which is applied to petroleum refining processes wherein hydrocarbon feedstocks which have relatively high molecular weights are converted to lower-molecular-weight hydrocarbons at elevated temperature and pressure in the presence of a hydrocracking catalyst and a hydrogen-containing gas. Hydrogen is consumed in the conversion of organic nitrogen and sulfur to ammonia and hydrogen sulfide, respectively, in the destruction of high-molecular-weight compounds into lower-molecular-weight compounds, and in the saturation of olefins and other unsaturated compounds. In hydrocracking processes, hydrocarbon feedstocks, such as gas oils that boil in the range of about 350° F. to about 1,000° F., typically, catalytic cycle oils boiling between about 350° F. and 850° F., are converted to lower-molecular-weight products, such as gasoline-boiling range products and light distillates.

Typical hydrocarbon feedstocks contain nitrogen compounds in amounts such that the amount of nitrogen present in greater than 20 parts per million. The nitrogen tends to reduce the activity of the catalyst used in the hydrocracking reaction. Such reduction in catalytic activity results in inefficient operation and poor product distribution and yields. As the nitrogen content increases, higher reaction temperatures are required to maintain a given conversion level. Generally, the nitrogen content of a hydrocarbon feedstock can be reduced by subjecting that feedstock to a feed-preparation treatment. In such instance, the nitrogen compounds are converted into ammonia. In addition, sulfur is converted into hydrogen sulfide.

Generally, low-temperature hydrocracking processes for maximizing gasoline-boiling-range products employ two processing stages. In the first stage, the feed-preparation stage, the feedstock is hydrotreated to remove nitrogen and sulfur that are typically found in the usual refinery feedstocks. In the second stage, the hydrocracking stage, the pretreated hydrocarbon stream is converted to lower-boiling products.

There are also one-stage hydrocracking processes. In a one-stage process, the denitrogenation and desulfurization occur in the first part of the catalyst bed or in the first reactor of a multi-reactor system. Therefore, denitrogenation, desulfurization, and hydrocracking may be performed by the same catalyst in a one-stage process. But two different catalysts may be used; the first catalyst for the denitrogenation and desulfurization; the second catalyst, for the hydrocracking. However, ammonia and hydrogen sulfide formed from the denitrogenation and desulfurization, respectively, are passed over the second catalyst along with the hydrocarbons that are to be hydrocracked by the second catalyst. No separation step occurs between the first catalyst bed and the second catalyst bed, whereby the ammonia and hydrogen sulfide are separated from the hydrocarbons.

The catalytic composition of the present invention may be used advantageously for hydrocracking of petroleum hydrocarbon fractions. It may be employed in either a one-stage hydrocracking process or a two-stage hydrocracking process. It may be used also for the disproportionation of petroleum hydrocarbons wherein alkyl groups of aromatic hydrocarbons are transferred fom one molecule to another. This latter process comprises contacting the petroleum hydrocarbon stream in a hydrocarbon-conversion zone with a catalytic composition of this invention in the presence of a hydrogen-affording gas under suitable hydrocarbon disproportionation conditions.

For the hydrocracking process, the hydrocarbon feedstock to be charged may boil in the range between about 350° F. and about 1,000° F. When operating to maximize gasoline production, the feedstock preferably has an end-point not greater than about 700°–750° F. Typically, a light catalytic cycle oil, or a light virgin gas oil, or mixtures thereof, boiling in the range of from about 350° F. to about 650° F. is employed as a feedstock. The feed may be pre-treated to remove compounds of sulfur and nitrogen. The feed may have a significant sulfur content, ranging from 0.1 to 3 weight percent and nitrogen may be present in an amount up to 500 p.p.m. or more. Temperature, space velocity, and other process variables may be adjusted to compensate for the effects of nitrogen on the hydrocracking catalyst activity.

The hydrocarbon feed preferably contains a substantial amount of cyclic hydrocarbons, i.e., aromatic and/or naphthenic hydrocarbons, since such hydrocarbons have been to be especially well-suited for providing a highly aromatic hydrocracked gasoline product. Advantageously, the feed contains at least about 35–40% aromatics and/or naphthenes.

In the hydrocracking process, the feedstock is mixed with a hydrogen-affording gas and preheated to hydrocracking temperature, then transferred to one or more hydrocracking reactors. Advantageously, the feed is substantially completely vaporized before being introduced into the reactor system. For example, it is preferred that the feed be all vaporized before passing through more than about 20% of the catalyst bed in the reactor. In some instances, the feed may be mixed phase vapor-liquid, and the temperature, pressure, recycle, etc. may be then adjusted for the particular feedstock to achieve the desired degree of vaporization.

The feedstock is contacted in the hydrocracking reaction zone with the hereinafter-described catalyst in the presence of hydrogen-affording gas. Hydrogen is consumed in the hydrocracking process and an excess of hydrogen is maintained in the reaction zone. Advantageously, a hydrogen-to-oil ratio of at least 5,000 standard cubic feet of hydrogen per barrel of feed (s.c.f.b.) is employed, and the hydrogen-to-oil ratio may range up to 20,000 s.c.f.b. Preferably, about 8,000 to 15,000 s.c.f.b. is employed. A high hydrogen partial pressure is desirable from the standpoint of prolonging catalyst activity maintenance.

The hydrocracking reaction zone is operated under conditions of elevated temperature and pressure. The total hydrocracking pressure usually is between about 700 and 4,000 p.s.i.g. and, preferably, between about 1,000 and 1,800 p.s.i.g. The hydrogen partial pressure, in general, is within the range of about 675 p.s.i.g. to about 3,970 p.s.i.g. The hydrocracking reaction is exothermic in nature and a temperature rise occurs across the catalyst bed. The average hydrocracking catalyst bed temperature is between about 650° F. and 850° F., and preferably a temperature between about 680° F. and 800° F. is maintained. The liquid hourly space velocity (LHSV) typically is within the range of about 0.5 to about 10 volumes of hydrocarbon per hour per volume of catalyst, and preferably within the range of about 1 to about 5 volumes of hydrocarbon per hour per volume of catalyst. Optimally, the LHSV is within the range of about 1 to about 2.

For the disproportionation process, typical feedstocks are petroleum hydrocarbon streams which contain monocyclic and dicyclic aromatic hydrocarbons which boil below about 650° F. Such aromatic hydrocarbon streams may be a petroleum hydrocarbon fraction which contains aromatics or it may be an aromatic hydrocarbon. For example, the feedstock may contain toluene, ortho-xylene, meta-xylene, and para-xylene, trimethylbenzenes, and tetramethylbenzenes. Typically, in the disproportionation process, the feedstock is mixed with a hydrogen-affording gas and pre-heated to a suitable disproportionation temperature, and then transferred to the disproportionation reaction zone, which may contain one or more reactors. Advantageously, the feed is substantially completely vaporized before being introduced into the reaction zone.

The feedstock is contacted in the disproportionation reaction zone with the hereinafter described catalyst in the presence of hydrogen-affording gas. Advantageously, a hydrogen-to-oil ratio of at least 1,000 standard cubic feet of hydrogen per barrel of feed (s.c.f.b.) is employed, and the hydrogen-to-oil ratio may range up to 50,000 s.c.f.b. Preferably, the hydrogen-to-oil ratio may range between about 5,000 s.c.f.b. and 30,000 s.c.f.b. Other operating conditions include an elevated temperature ranging between about 700° F. and about 1,100° F., preferably between about 850° F. and about 1000° F.; an elevated pressure ranging between about 100 p.s.i.g. and about 1000 p.s.i.g., preferably between about 200 p.s.i.g. and about 500 p.s.i.g.; and a weight hourly space velocity (WHSV) ranging between about 0.1 and about 20 weight units of hydrocarbon per hour per weight unit of catalyst, preferably between about 1 and about 10 weight units of hydrocarbon per hour per weight unit of catalyst. The exothermic demethanation reaction that occurs in the disproportionation reaction zone may be controlled by the treatment of the catalyst with sulfur compounds, such as hydrogen sulfide and carbon disulfide, either prior to or at the start of the disproportionation reaction.

In addition to being a catalyst for hydrocracking and for disproportionation, the catalytic composition of the present invention is a suitable catalyst for the isomerization of alkyl aromatics, the transalkylation between aromatic hydrocarbons, the hydrodealkylation of hydrocarbon-substituted aromatic compounds, and the reforming of petroleum hydrocarbon naphtha streams.

The catalytic composition of this invention comprises a hydrogenation component on a co-catalytic acidic cracking support. The hydrogenation component comprises a member selected from the group consisting of (1) uranium and a Group VI–B metal of the Periodic Table of Elements; (2) a Group VI–B metal and a Group VIII metal of the Periodic Table of Elements; (3) uranium, a Group VI–B metal and a Group VIII metal; (4) their oxides; (5) their sulfides; and (6) mixtures of the metals, their oxides, and their sulfides. The selected Periodic Table of Elements is the table that is presented on pages 448 and 449 of the Handbook of Chemistry and Physics, 40th edition, Chemical Rubber Publishing Co., Cleveland, Ohio, 1958. The Group VI–B metals are chromium, molybdenum, and tungsten. The preferred metals of Group VIII are nickel and cobalt.

The hydrogenation component may be deposited on the acidic cracking support, or it may be incorporated into the acidic cracking support by impregnation of heat-decomposible salts of the desired metals. Each of the metals may be impregnated into the support separately. Uranium and the Group VIII metal, if a Group VIII metal is being used, may be co-impregnated into the support. However, molybdenum must be impregnated separately, since most molybdenum salts will precipitate in the presence of uranium. The molybdenum may be impregnated either before or after the others. Alternatively, the hydrogenation component metals may be coprecipitated with a hydrogel of silica-alumina. In this latter method, the finely-divided crystalline aluminosilicate material is thoroughly blended into the hydrogen and then each metal of the hydrogenation component is added separately to the blend in the form of a heat-decomposible salt of that metal. The composite is subsequently dried and calcined to decompose the salts and remove the undesired anions.

The catalytic composition of this invention is characterized by the presence of at least some uranium in the catalytic composite. It should contain at least 0.5 weight percent uranium, calculated as $UO_2$. The uranium may be present as part of the hydrogenation component, as described above, or it may be present as cations in the large-pore crystalline aluminosilicate material, as described below, or it may be present as both. When the uranium is part of the hydrogenation component, the combined amount of uranium and Group VI–B metal is within the range of about 1 weight percent to about 25 weight percent, the uranium being calculated as $UO_2$ and the Group VI–B metal being calculated as its oxide. For example, if the Group VI–B metal were molybdenum, its amount would be calculated as $MoO_2$. When the hydrogenation component of the catalytic composition comprises uranium and molybdenum, and oxides, and sulfides, and mixtures thereof, the preferred amount of the oxide component is within the range of about 5 weight percent to about 15 weight percent, the uranium being calculated as $UO_2$ and molybdenum being calculated as $MoO_3$.

The Group VIII metal should be present in an amount within the range of about 1 weight percent to about 10 weight percent, calculated as its oxide.

The catalytic composition of the present invention is economical to prepare. The Group VI–B and Group VIII metals are readily available and, with the exclusion of the platinum group and palladium group, are economical. Uranium is available at reasonable prices. A typical source of uranium is the recovered non-radioactive uranyl nitrate that is obtained from waste nuclear fuels.

The cracking support comprises a large-pore crystalline aluminosilicate material and a silica-alumina cracking catalyst, the large-pore crystalline aluminosilicate material being a member selected from the group consisting of uranium-exchanged X-type aluminosilicate material, uranium-exchanged Y-type aluminosilicate material, uranium-exchanged L-type aluminosilicate material, and ultrastable, large-pore crystalline aluminosilicate material. The cracking support material contains from about 5 to about 50 weight percent large-pore crystalline aluminosilicate material. Preferably, the large-pore crystalline aluminosilicate material is distributed throughout and suspended in a porous matrix of the amorphous silica-alumina cracking catalyst. Both low-alumina silica-alumina and high-alumina silica-alumina cracking catalysts may be employed in the support of this catalytic composition. Generally, low-alumina silica-alumina cracking catalysts contain from about 10 weight percent to about 15 weight percent alumina. High-alumina silica-alumina cracking catalysts contain from about 20 weight percent to about 40 weight percent alumina. A low-alumina silica-alumina cracking catalyst is preferred.

In addition, the catalytic composition of this invention is characterized by the presence of large-pore crystalline aluminosilicate materials. Characteristics of such aluminosilicate materials and methods for preparing them have been presented in the chemical art. Their structure comprises a network of relatively small aluminosilicate cavities, which are interconnected by numerous pores. These pores are smaller than the cavities and have an essentially uniform diameter at their narrowest cross section. Basically, the network of cavities is a fixed three-dimensional and ionic network of silica and alumina tetrahedra. These tetrahedra are cross-linked by the sharing of oxygen atoms. Cations are included in the crystal structure of the aluminosilicate material to balance the electrovalence of the tetrahedra. Examples of such cations are metal ions, hydrogen ions, and hydrogen-ion precursors, such as ammonium ions. By means of the technique known as cation exchange, one cation may be exchanged for another. This technique is well known to those skilled in the art and is briefly described hereinafter.

The large-pore crystalline aluminosilicate materials that may be used in the catalytic composition of this invention include uranium-exchanged X-type aluminosilicate material; uranium-exchanged Y-type aluminosilicate material; uranium-exchanged L-type aluminosilicate material; ultrastable, large-pore crystalline aluminosilicate material; and uranium-exchanged, ultrastable, large-pore crystalline aluminosilicate material. X-type, Y-type, and L-type large-pore crystalline aluminosilicate materials are described in depth in the chemical art. For example, X-type material is described in U.S. Pats. 2,882,244 and 3,069,362; Y-type materials are described in United States Pat. 3,130,006; and X-type, Y-type, and L-type crystalline aluminosilicate materials are described in U.S. Pats. 3,013,982; 3,013,983; 3,013,984; 3,013,985; and 3,013,986. An example of the ultrastable, large-pore crystalline aluminosilicate materials is Z–14US, which is described in U.S. Pat. 3,293,192.

The ultrastable, large-pore crystalline aluminosilicate material that may be employed in the catalytic composition of this invention is stable to exposure to elevated temperatures and stable to repeated wetting-drying cycles. Its stability is demonstrated by its surface area after calcination at 1725° F. After calcination at a temperature of 1725° F. for a period of two hours, there is retained a surface area of greater than 150 m.$^2$/gm. Moreover, its stability is demonstrated by its surface area after a steam treatment with an atmosphere of 25% steam at a temperature of 1525° F. for 16 hours. Its surface area after this steam treatment is greater than 200 m.$^2$/gm.

The ultrastable, large-pore crystalline aluminosilicate material exhibits extremely good stability toward wetting, which is defined as that ability of a particular aluminosilicate material to retain surface area or nitrogen-adsorption capacity after contact with water or water vapor. A sodium-form of the ultrastable, large-pore crystalline aluminosilicate material (about 2.15 weight percent sodium) was shown to have a loss in nitrogen-adsorption capacity that is less than 2 percent per wetting when tested for stability to wetting by subjecting the material to a number of consecutive cycles, each cycle consisting of a wetting and a drying.

The crystalline aluminosilicate materials that are employed in the catalytic composition of this invention are large-pore materials. By large-pore material is meant material that has pores which are sufficiently large to permit the passage thereinto of benzene molecules and larger molecules and the passage therefrom of reaction products. For use in petroleum hydrocarbon conversion processes, it is preferred to employ a large-pore aluminosilicate material having a pore size of at least 9 to 10 angstrom units. The large-pore crystalline aluminosilicate materials that are employed in the catalytic composition of this invention possess such a pore size.

The ultrastable, large-pore crystalline aluminosilicate material employed in the catalytic composition of this invention exhibits a cubic unit cell dimension and hydroxyl infrared bands that distinguish it from other aluminosilicate materials.

The cubic unit cell dimension of the ultrastable, large-pore crystalline aluminosilicate material is within the range of about 24.20 angstrom units to about 24.55 angstrom units. This range has been slightly enlarged over that which has been previously disclosed in Ser. No. 749,838, the parent of this application, since the X-ray techniques employed today to measure this dimension are much more sophisticated and accurate than those used to obtain the earlier measurements.

The hydroxyl infrared bands obtained with the ultrastable, large-pore crystalline aluminosilicate material are a band near 3750 cm.$^{-1}$, a band near 3700 cm.$^{-1}$, and a band near 3625 cm.$^{-1}$. The band near 3750 cm.$^{-1}$ may be found on many of the hydrogen-form and decationized aluminosilicate materials, but the band near 3700 cm.$^{-1}$ and the band near 3625 cm.$^{-1}$ are characteristic of the ultrastable, large-pore crystalline aluminosilicate material that is employed in the catalytic composition of the present invention.

The ultrastable, large-pore crystalline aluminosilicate material is also characterized by an alkali metal content of less than 1 percent.

While it is preferable to employ the large-pore crystalline aluminosilicate materials suspended in the porous matrix of the amorphous silica-alumina cracking catalyst as the base for the hydrogenation component, the large-pore crystalline aluminosilicate material may be dispersed in or physically admixed with the porous matrix material. Silica-alumina cracking catalyst containing from about 10 to about 50 weight percent alumina is a preferred matrix material. The crystalline aluminosilicate material may be present in any suitable amount, and typically about 5 to 50 weight percent crystalline aluminosilicate material is employed in the catalytic composition of the invention.

The co-catalytic acidic cracking support of the catalytic composition of the present invention may be prepared by various well-known methods and formed into pellets, beads, and extrudates of the desired size. For example, the large-pore crystalline aluminosilicate material may be pulverized into finely-divided material, and this latter material is then intimately admixed with the silica-alumina cracking catalyst. The finely-divided crystalline aluminosilicate material may be admixed thoroughly with a hydrosol or hydrogel of the silica-alumina material. Where a thoroughly blended hydrogel is obtained, this hydrogel may be dried and broken into pieces of desired shapes and sizes. The hydrogel may also be formed into small spherical particles by conventional spray drying techniques or equivalent means.

In a preferred embodiment, the uranium is cation-exchanged into the large-pore crystalline aluminosilicate material. The uranium is used to replace at least a portion of the alkali metal cations present in the large-pore crystalline aluminosilicate material. Preferably, the uranium is used to replace a substantial amount of the alkali metal present. The exchange may be made conveniently by direct exchange of the large-pore crystalline aluminosilicate material with a salt of uranium, such as uranyl nitrate. It may be made also with a large-pore crystalline aluminosilicate material that has been partially exchanged with ammonium ions. In addition, a combination of uranyl and ammonium ions may be employed to cation-exchange the alkali-metal cations of the large-pore crystalline aluminosilicate material. In this latter situation, the resultant aluminosilicate material may be in an ammonium-uranyl form prior to the final heating. Cation-exchange should be performed to reduce the sodium content of the aluminosilicate material to a level below about 4 weight percent, preferably below about 1 weight percent.

In the cation-exchange treatment, the use of elevated temperatures and solutions having a greater concentration of the ions to be exchanged accelerate the time required for the exchange to become effective. The temperature may range from about room temperature to a temperature that is just below the decomposition temperature of the aluminosilicate material or the boiling point of the treating solution, whichever is lower. The concentration of the replacing ion or ions must be sufficient to provide the desired reduction of the alkali metal content of the large-pore crystalline aluminosilicate material.

While other solutions, such as alcoholic solutions, may be used in the cation-exchange treatment, aqueous solutions of uranium salts are preferred. Whatever the particular solvent may be, it must be one in which the uranium and/or ammonium salts undergo ionization.

The exchange treatment may comprise one or more treatments with the solution containing the desired cation or cations. After each treatment with the solution containing the desired cation or cations, the aluminosilicate material is washed with distilled water until the free anions have been removed from the treated crystalline aluminosilicate material. The washed, cation-exchange aluminosilicate material is dried in air at a temperature that will not deleteriously affect the aluminosilicate material.

The time of contact of the cation-exchange solution with the aluminosilicate material and the number of contacting periods required is determined by the temperature of the solution, the particular aluminosilicate material employed, the particular compound or compounds of cations employed, and the degree in reduction of the alkali metal content desired.

The washed cation-exchange aluminosilicate material is dried. It is contemplated that the cation-exchange may be accomplished either before or after the large-pore crystalline aluminosilicate material has been suspended in the matrix of the amorphous silica-alumina material. Furthermore it is contemplated that any ionizable compound of uranium that will not form a precipitate with the alkali metal cations, such as uranyl nitrate, may be used alone or in combination with ammonium ions to cation-exchange the particular large-pore crystalline aluminosilicate material.

Any of the above-described types of large-pore crystalline aluminosilicate materials may be cation-exchanged with uranium. However, in the case of the ultrastable aluminosilicate material, cation-exchange treatment would be carried out with the soda form of the ultrastable material, that is, the material would contain approximately 2 to 3 weight percent alkali metal. After the cation-exchange treatment of the soda form has been completed, the uranium-exchanged crystalline aluminosilicate material is heated at a temperature within the range of about 900° F. to about 1500° F. for a time sufficient to produce the ultrastable material.

A preferred embodiment of the hydrocarbon conversion process of this invention is a one-stage hydrocracking process that is depicted in the accompanying drawing. This embodiment is for the purpose of illustration only and is not intended to limit the scope of the present invention.

Referring to the drawing, fresh hydrocarbon feed boiling within the range of about 400° F. to about 632° F. and containing 0.25 weight percent sulfur and 159 parts per million nitrogen is obtained from feed source 10. These and other properties of the feedstock are presented in Table I. This particular feed is a blend of 30 volume percent light virgin gas oil (LVGO) and 70 volume percent light catalytic cycle oil (LCCO).

TABLE I

| Feedstock properties | |
|---|---|
| Gravity, ° API | 27.5 |
| ASTM distillation, ° F.: | |
| Volume percent overhead— | |
| 0 | 398 |
| 5 | 454 |
| 10 | 475 |
| 30 | 519 |
| 50 | 546 |
| 70 | 563 |
| 90 | 614 |
| EP | 632 |
| Sulfur, wt. percent | 0.25 |
| Nitrogen, p.p.m. | 159 |
| Molecular weight | 209 |
| Refractive index (20° C.) | 1.5026 |
| Molecular type, vol. percent: | |
| Aromatics | 42.2 |
| Paraffins | 23.5 |
| Naphthenes | 34.3 |

About 40,000 barrels per calendar day (BCD) of fresh hydrocarbon feed are pumped through lines 11 and 12 by means of pump 13. Hydrogen-affording gas is passed through line 14 and into line 12 to be intimately mixed with the fresh hydrocarbon feed therein. The resulting hydrogen-hydrocarbon mixture is passed through line 15, feed preheat exchanger 16, and line 17 into the upper section of hydrocracking reaction zone 18.

The hydrocracking reaction zone 18 contains one or more fixed beds of a preferred embodiment of the catalytic composition of the present invention. This catalytic composition comprises 2.5 weight percent $UO_2$ and 10.0 weight percent $MoO_3$ on a support that comprises 35 weight percent ultrastable, large-port crystalline aluminosilicate material suspended in a porous matrix of amorphous silica-alumina. The amount of crystalline aluminosilicate material is based on the weight of the support only, while the amounts of the hydrogenation metals are based upon the total weight of the catalytic composition. The amorphous silica-alumina contains about 13 weight percent alumina. The catalyst is represented by bed 19.

The temperature of the feed to the reactor in line 17 is within the range of about 675° F. to about 700° F. at the beginning of the run and is gradually increased as the run progresses in order to compensate for the gradual decline in the activity of the catalyst. The hydrocracking reaction is exothermic; therefore, the temperature of the reactants tends to increase as the reactants pass downward through the bed of the catalyst. In order to control the temperature increase and limit the maximum temperature within the reactor, a liquid quench stream is introduced into the catalyst bed at about the middle thereof via line 20. This liquid quench is fresh feed from feed line 12 and/or recycled oil from recycle line 21 described hereinafter. A hydrogen-rich gas quench stream, described below, is also introduced at about the same point in the reaction zone as the liquid quench stream via line 22.

The process conditions include a temperature of about 650° F. to about 850° F., an LHSV of about 1 to about 5, and a pressure of about 1,250 p.s.i.g.

Effluent from reaction zone 18 is passed through lines 23, 24, and 25 and coolers 26 and 27 into high-pressure separator 28. Wash water is introduced into line 24 by way of line 29. In line 24, the wash water is mixed with the hydrocracked effluent and upon passing through cooler 27 and line 25 separates as an aqueous phase in the high-pressure separator 28. This wash water dissolves the ammonia and hydrogen sulfide in the effluent and removes them therefrom. The wash water containing the dissolved ammonia and hydrogen sulfide is withdrawn from high-pressure separator 28 by the way of line 30. The gas which separates from the liquid in high-pressure separator 28 is withdrawn from separator 28 via line 31, compressed by gas compressor 32, and passed via line 33 into gas quench line 22 and/or recycle gas line 34. The recycle gas in line 34 in introduced into the hydrocarbon stream that is passing through line 12 for subsequent charging into hydrocracking reaction zone 18.

The liquid hydrocarbons are withdrawn from high-pressure separator 28 via line 35 and are passed by way of line 35 into low-pressure separator 36. The gas phase from the low-pressure separator 36, comprising primarily light hydrocarbons and hydrogen, is withdrawn via line 37 as flash gases, which are used conveniently as fuel gas. The liquid hydrocarbon layer from the low-pressure separator 36 is withdrawn from separator 36 via line 38 and passed therethrough to and into fractionator 39. In fractionator 39, the liquid hydrocarbons are fractionated into a light-gasoline fraction, a heavy-gasoline fraction, and a bottoms fraction. The bottoms fraction is withdrawn from the bottom of fractionator 39 and recycled via lines 40 and 41 and recycle pump 42, one portion through lines 43, 21, and 20 and heat exchanger 44 into hydrocracking reaction zone 18 and another portion via line 45 into the feed pre-heat exchanger 16 by way of lines 14 and 15. A portion of the bottom fraction may be withdrawn from line 40 by way of line 46.

About 12,200 BCD of light hydrocracked gasoline ($i$-$C_5$ through 180° F.) are distilled overhead in the fractionator 39 and are withdrawn therefrom via line 47.

About 29,900 BCD of heavy gasoline (180° F.–380° F.) are withdrawn from fractionator 39 by way of line 48 for use in other refinery process units, such as a reformer. Although fractionator 39 is shown as only one column, it is to be understood that other satisfactory recovery systems may be used and are deemed to be within the scope of the present invention. Such other satisfactory recovery systems are known by those having ordinary skill in the art. Alternatively, a butane stream can also be withdrawn.

Make-up hydrogen from source 49 is passed through line 50 and compressed in compressor 51. The compressed make-up hydrogen is then passed through line 52 and 14 to be admixed with the hydrogen-hydrocarbon mixture to be introduced into hydrocracking reaction zone 18.

The following examples are presented to facilitate a better understanding of the present invention. It is to be understood that these examples are for the purpose of illustration only and are not to be regarded as a limitation of the present invention.

Each of the tests in the following examples was conducted in typical bench-scale test equipment, which employed a tubular stainless steel reactor and conventional product-recovery and analytical equipment. The reactor was 20 inches long and had an inside diameter of 0.622 inch. A catalyst charge of 19 grams of granular material which would pass through a 12-mesh U.S. Sieve, but not a 20-mesh U.S. Sieve, was employed. The catalyst was supported in the lower one-third of the reactor on a layer of 4 millimeter Pyrex glass beads. The volume of reactor above the catalyst bed was empty. The catalyst bed occupied about 6.9 to about 7.3 inches of reactor length, depending on the bulk density of the catalyst. The desired reactor temperature was maintained by the use of a heated molten salt bath of Du Pont HITEC. Internal reactor temperature were measured by means of an axial thermocouple.

Prior to its test, each catalyst was pretreated at 1,250 p.s.i.g. and 500° F. for 16 hours with hydrogen flowing at the rate of 50 standard cubic feet per hour per pound of catalyst. Hydrocarbon feed was started at 500° F. and the temperature was increased over a period of several hours until the desired conversion level was reached. Thereafter, temperature was adjusted to maintain approximately 77 weight percent conversion. Other processing conditions included a total pressure of 1,250 p.s.i.g., a weight hourly space velocity (WHSV) of about 1.38 grams of hydrocarbon per hour per gram of catalyst (the LHSV varied between about 0.86 and about 0.91 volumes of hydrocarbon per hour per volume of catalyst depending on the bulk density of the catalyst) and a hydrogen addition rate of about 12,000 s.c.f.b. The hydrocarbon feedstock employed was the low-sulfur blend of LVGO and LCCO that was previously described. Its properties are shown above in Table I.

For each test, data were obtained from 1 to 13 days on stream. Weight balances were obtained on two hour samples taken at intervals of at least 24 hours. Product recoveries were generally above 99.0 weight percent, based on the hydrocarbon feed. Gas and liquid analyses were combined and normalized to 100 percent to obtain the conversion level. Product distributions were calculated to a total of 103 weight percent, based on hydrocarbon feed, to account for hydrogen consumption.

As used herein, conversion is defined as the percent of the total reactor effluent, both gas and liquid, that boils below a true boiling point of 380° F. This percent was determined by gas chromatography. The hydrocarbon product was sampled for analyses at intervals of not less than 24 hours. The sampling period was two hours, during which time the liquid product was collected under a Dry-Ice-acetone condenser to insure condensation of pentanes and heavier hydrocarbons. During this time, the hydrogen-rich off-gas was sampled and immediately analyzed for light hydrocarbons by isothermal gas chromatography. The liquid product was weighed and analyzed using a dual-column temperature-programmed gas chromatograph equipped with 6 feet x ¼ inch columns of SF–96 on fire brick and thermal-conductivity detectors. Individual compounds were measured through methylcyclopentane. The valley in the chromatograph just ahead of the n-undecane peak was taken as the 380° F. point. The split between light and heavy naphtha (180° F.) was arbitrarily selected as a specific valley within the $C_7$-paraffin-naphthene group to conform with the split obtained by Oldershaw distillation of the product.

Temperature requirements for 77 percent conversion were calculated from the observed data by means of zero order kinetics and an activation energy of 35 kilocalories. Adjustment in temperature requirement was made also to a constant hydrogen-to-oil ratio of 12,000 s.f.c.b. using the equation:

$$\Delta T° F. = (1.3)(R-12)$$

where R is the gas rate in 1,000 s.c.f.b.

The temperature required for 77 percent conversion was selected as the means for expressing the activity of the catalyst being tested. To eliminate irregular values that might be present at the start of the run, an estimated value for the temperature required for 77 percent conversion at 7 days on stream was obtained for each catalyst. To estimate these values, a plot showing the temperatures required for 77 percent conversion as ordinates and days on stream as abscissae was prepared and the value of the temperature at 7 days on stream was read from the smooth curve of this plot. This latter value was the activity of the catalyst that was employed in the test from which the plotted data were obtained.

The heavy naphtha yield, i.e., the yield of product boiling between 180° F. and 380° F., was corrected for temperature and conversion. The following equation was used to calculate the heavy naphtha yield at common conditions of 725° F. and 77 weight percent conversion.

$$H_0 = H + 15.5 \times 10^4 \left(\frac{1}{T_0} - \frac{1}{T}\right) + 7.5$$
$$\times 10^8 \left(\frac{1}{T_0} - \frac{1}{T}\right)_2 + 13.2 \log\left(\frac{100-C_0}{100-C}\right)$$

where $H_0$ = heavy naphtha yield at 725° F. and 77 weight percent conversion,
H = observed heavy naphtha yield, in weight percent,
$T_0$ = 658° K. (725° F.),
T = observed temperature in ° K.,
$C_0$ = 77 weight percent conversion, and
C = observed conversion.

The heavy naphtha yield was used to express catalyst selectivity.

EXAMPLE I

A commercially prepared catalyst was selected as the reference catalyst. This catalyst is hereinafter designated as Catalyst A. The carrier of Catalyst A was a low-alumina (about 13 percent alumina) silica-alumina material having suspended in its matrix 35 weight percent ultrastable, large-pore crystalline aluminosilicate material. Cobalt and molybdenum were introduced into the carrier by means of a cobalt acetate solution and an ammonium molybdate solution, respectively. The finished Catalyst A was found to contain 2.52 weight percent CoO and 9.46 weight percent $MoO_3$.

Catalyst A was tested for its ability to hydrocrack the abovementioned hydrocarbon feedstock. The data obtained from this test are presented in Table II.

TABLE II

Data Obtained With Catalyst A

| Days on stream | 1 | 2 | 7 | 8 | 9 | 12 | 13 |
|---|---|---|---|---|---|---|---|
| Temperature, °F | 697 | 703 | 711 | 706 | 708 | 710 | 699 |
| Hydrogen rate, M s.c.f.b | 12.6 | 12.8 | 12.1 | 11.9 | 12.0 | 12.8 | 13.1 |
| Conversion, wt. percent | 78.6 | 89.4 | 93.5 | 83.5 | 82.9 | 86.5 | 70.5 |
| Product distribution, wt. percent: | | | | | | | |
| Dry gas ($C_1$-$C_3$) | 3.6 | 3.5 | | 3.5 | 3.8 | 4.0 | 4.7 |
| Butane | 11.3 | 12.3 | | 12.0 | 13.7 | 12.5 | 12.2 |
| Pentane | 9.1 | 10.7 | | 11.3 | 10.0 | 10.1 | 8.1 |
| Light naphtha ($C_6$-180° F.) | 16.5 | 19.2 | | 16.9 | 16.8 | 17.2 | 14.9 |
| Heavy naphtha (180-380° F.) | 62.5 | 57.3 | | 59.3 | 58.7 | 59.2 | 63.1 |
| Heavy naphtha, corrected | | 60.3 | | 59.1 | 58.3 | 61.2 | 56.7 |
| Temperature, °F., for 77% conversion | 696.9 | 697.2 | 702.3 | 702.3 | 704.7 | 705.8 | 704.5 |

EXAMPLE II

In this example, a specific embodiment of the catalytic composition of the present invention was prepared. This catalyst is hereinafter designated as Catalyst B. A sample of 90 grams of low-alumina (about 13 percent alumina) silica-alumina having suspended in its matrix 35 weight percent ultrastable, large-pore crystalline aluminosilicate material was employed as the catalyst support for Catalyst B. A solution of uranyl nitrate was prepared by dissolving 4.7 grams of $UO_2(NO_3)_2 \cdot 6H_2O$ in 50 milliliters of distilled water at a temperature of about 160° F. to about 180° F. and this solution was used to impregnate the catalyst support. Another solution was prepared by dissolving 12.1 grams of ammonium molybdate in 50 milliliters of distilled water at a temperature of about 160° F. to about 180° F. and this solution was subsequently used to impregnate the uranium-impregnated support with molybdenum. After a thorough blending, the catalytic composite was dried at a temperature of 250° F. in air at a flow rate of about 1.5 cubic feet of air per hour for 3 hours. The composite was pelleted into ¼-inch x ¼-inch pellets with the aid of 4 weight percent Sterotex. The pellets were calcined in air for 3 hours at a temperature of 1,000° F. and a flow rate of about 1.5 cubic feet of air per hour. Catalyst B was prepared to contain 2.5 weight percent $UO_2$ and 10 weight percent $MoO_3$.

Catalyst B was tested for its ability to hydrocrack the abovementioned hydrocarbon feedstock. The data obtained from this test are presented in Table III. While the temperatures required for 77 percent conversion for these two catalysts, Catalyst A and Catalyst B, are similar, the heavy naphtha yield obtained with Catalyst B is greater than that obtained with Catalyst A.

pared. This catalyst is hereinafter designated as Catalyst C.

Catalyst C was prepared by impregnating a 97-gram portion of the selected support with the desired hydrogenation metals. The support comprised 35 weight percent ultrastable, large-pore crystalline almino-silicate material suspended in a matrix of low-alumina silica-alumina (about 13 weight percent alumina). A solution was prepared by dissolving 9.7 grams of cobaltous nitrate and 12.1 grams of ammonium molybdate in 75 milliliters of distilled water at a temperature of about 160° F. to about 180° F. and this solution was employed to impregnate the catalyst support with cobalt and molybdenum. A second solution was prepared by dissolving 4.7 grams of $UO_2(NO_3)_2 \cdot 6H_2O$ in 50 milliliters of distilled water at a temperature of about 160° F. to about 180° F., and this solution was used to impregnate the composite with uranium. After thorough blending, the composite was dried for one hour in air at a temperature of 250° F. and a flow rate of 1.5 cubic feet of air per hour. The material was pelleted into ¼-inch x ¼-inch pellets with the aid of about 4 weight percent Sterotex. The pellets were calcined subsequently for three hours at a temperature of 1,000° F. and an air flow rate of about 1.5 cubic feet per hour. Catalyst C was prepared to contain 2.5 weight percent CoO, 2.5 weight percent $UO_2$, and 10 weight percent $MoO_3$.

Catalyst C was tested for its ability to hydrocrack the abovementioned hydrocarbon feedstock. The data obtained from this test are presented in Table IV. It is seen that while there was a slight drop in heavy naphtha product, the temperature required for 77 percent conversion was lower than that of Catalyst A, that is, the activity of Catalyst C was greater than that of the reference cat-

TABLE III

Data Obtained With Catalyst B

| Days on stream | 2 | 6 | 7 | 8 | 9 | 13 |
|---|---|---|---|---|---|---|
| Temperature, °F | 703 | 710 | 705 | 707 | 705 | 698 |
| Hydrogen rate, M s.c.f.b | 11.6 | 11.4 | 13.2 | 13.7 | 11.9 | 13.0 |
| Conversion, wt. percent | 89.3 | 90.3 | 81.5 | 84.5 | 72.8 | 64.7 |
| Product distribution, wt. percent: | | | | | | |
| Dry gas ($C_1$-$C_3$) | 3.3 | 4.0 | 3.7 | 3.8 | 3.2 | 3.0 |
| Butane | 11.0 | 12.5 | 12.9 | 11.5 | 9.4 | 9.8 |
| Pentane | 9.8 | 11.5 | 10.7 | 10.5 | 9.9 | 8.6 |
| Light naphtha ($C_6$-180° F.) | 18.0 | 18.8 | 16.2 | 16.7 | 15.7 | 14.7 |
| Heavy naphtha (180-380° F.) | 60.9 | 56.2 | 59.5 | 60.5 | 64.8 | 66.9 |
| Heavy naphtha, corrected | 63.8 | 60.8 | 58.6 | 61.0 | 60.0 | 59.0 |
| Temperature, °F. for 77% conversion | 695.8 | 702.0 | 704.0 | 705.0 | 706.8 | 707.2 |

EXAMPLE III

In this example, another specific embodiment of the catalyst composition of the present invention was prealyst, Catalyst A. With the improved activity, this catalyst could be used for a longer period of time before a catalyst change or catalyst reactivation would be needed.

TABLE IV

Data Obtained With Catalyst C

| Days on stream | 2 | 5 | 6 | 7 | 8 | 12 | 13 |
|---|---|---|---|---|---|---|---|
| Temperature, °F | 689 | 698 | 694 | 696 | 695 | 696 | 700 |
| Hydrogen rate, M s.c.f.b | 11.2 | 11.0 | 11.9 | 12.1 | 11.3 | 11.3 | 12.8 |
| Conversion, wt. percent | 79.0 | 78.4 | 72.4 | 75.9 | 72.8 | 68.0 | 78.3 |
| Product distribution, wt. percent: | | | | | | | |
| Dry gas ($C_1$-$C_3$) | 4.0 | 3.1 | 3.3 | 3.1 | 2.9 | 3.0 | 3.3 |
| Butane | 10.7 | 11.0 | 11.6 | 10.3 | 10.3 | 10.3 | 12.0 |
| Pentane | 9.0 | 9.5 | 10.3 | 10.7 | 10.1 | 9.5 | 9.6 |
| Light naphtha ($C_6$-180° F.) | 16.8 | 15.8 | 15.7 | 16.6 | 15.4 | 15.5 | 16.4 |
| Heavy naphtha (180-380° F.) | 62.5 | 63.6 | 62.1 | 62.3 | 64.3 | 64.7 | 61.7 |
| Heavy naphtha, corrected | 58.2 | 59.9 | 56.8 | 58.3 | 58.2 | 57.4 | 58.2 |
| Temperature, °F. for 77% conversion | 686.8 | 695.8 | 696.6 | 696.8 | 696.6 | 700.8 | 700.3 |

EXAMPLE IV

In this example, another embodiment of the catalytic composition was prepared. This catalyst, which contains uranium-exchanged Y-type aluinosilicate material, is designated hereinafter as Catalyst D.

In the preparation of Catalyst D, 250 grams of Y-type aluminosilicate material manufactured by the Linde Division of the Union Carbide Corporation were cation-exchanged with uranium and ammonium ions. The aluminosilicate material was contacted under stirring with a solution containing uranium and ammonium ions at 90° C. for 3 hours. This solution was prepared by dissolving 50 grams of uranyl nitrate, $UO_2(NO_3)_2 \cdot 6H_2O$, and 150 grams of ammonium sulfate $(NH_4)_2SO_4$, in 1 liter of distilled water. The cation-exchanged material was filtered and washed with approximately 1 gallon of hot distilled water (at a temperature of about 160° F. to about 180° F.) in 500-milliliter increments.

The aluminosilicate material was then contacted with a second solution or uranium and ammonium ions prepared as above. This contacting was carried out overnight at 90° C. (194° F.) with stirring. The treated material was filtered and washed with distilled water as above.

The treated aluminosilicate material was contacted with a third solution of uranium and ammonium ions prepared as above. This contacting was carried out at 90° C. (194° F.) with stirring. The treated material was filtered and washed with hot distilled water as above, dried at 250° F. in air at a flow rate of 1.5 cubic feet of air per hour and calcined in air for 3 hours at 1000° F. and an air flow rate of 1.5 cubic feet per hour. The resultant cation-exchanged Y-type aluminosilicate material was found to contain 0.30 weight percent sodium and 1.08 weight percent $UO_2$.

A 35.0-gram portion of the cation-exchanged Y-type aluminuosilicate material, which would pass through a 100-mesh U.S. Sieve, was blended into 500 grams of American Cyanamid high-alumina silica-alumina hydrogel (13 weight percent solids). The blend was dried in air at 250° F. and at an air flow rate of 1.5 cubic feet per hour and calcined in air for 3 hours at 1000° F. and an air flow rate of 1.5 cubic feet per hour. The calcined material was pulverized to pass through a 30-mesh U.S. Sieve. This 30-mesh material was the catalyst support for Catalyst D.

A solution containing cobalt and molybdenum was used to impregnate 88 grams of the above support. This solution was prepared by dissolving 8.4 grams of cobalt acetate in 50 milliliters of hot distilled water (160° F.–180° F.), adjusted to a pH of 5 with acetic acid, and combining therewith a solution that had been prepared by dissolving 12.1 grams of ammonium molybdate in 50 milliliters of hot distilled water (160° F.–180° F.). The impregnated material was dried at 250° F. in air at an air flow rate of 1.5 cubic feet per hour for about 2 hours, blended with Sterotex (about 4 weight percent), shaped into ¼-inch x ¼-inch pellets, and calcined in air for 3 hours at 1000° F. and an air flow rate of 1.5 cubic feet per hour. The catalyst, Catalyst D, was prepared to contain 2.5 weight percent cobalt oxide and 10.0 weight percent molybdenum trioxide.

Catalyst D was tested for its ability to hydrocrack the feedstock described in Table I. The data obtained from this test are presented in Table V.

TABLE V
Data Obtained With Catalyst D

| Days on stream | 3 | 6 | 7 | 8 | 9 | 10 | 13 | 14 |
|---|---|---|---|---|---|---|---|---|
| Temperature, °F | 697 | 693 | 693 | 691 | 692 | 695 | 694 | 697 |
| Hydrogen rate, M s.c.f.b | 13.1 | 11.0 | 11.8 | 13.1 | 11.9 | 11.5 | 12.9 | 13.1 |
| Conversion, wt. percent | 87.9 | 75.5 | 77.7 | 75.6 | 74.9 | 76.5 | 77.2 | 78.5 |
| Product distribution, wt. percent: | | | | | | | | |
| Dry gas ($C_1$–$C_3$) | 4.2 | 4.5 | 3.3 | 3.2 | 3.2 | 3.3 | 3.3 | 3.4 |
| Butane | 11.6 | 9.8 | 10.7 | 10.2 | 10.3 | 10.8 | 10.8 | 10.1 |
| Pentane | 10.2 | 9.8 | 10.6 | 9.1 | 10.4 | 9.7 | 10.3 | 10.1 |
| Light naphtha ($C_6$–180° F.) | 17.4 | 15.9 | 16.3 | 16.1 | 15.7 | 16.3 | 16.0 | 16.8 |
| Heavy naphtha (180°–380° F.) | 59.6 | 63.0 | 62.1 | 64.4 | 63.4 | 62.9 | 62.6 | 62.6 |
| Heavy naphtha, corrected | 60.9 | 57.6 | 57.6 | 59.0 | 57.8 | 58.1 | 58.0 | 58.9 |
| Temperature, °F., for 77% conversion | 692.4 | 692.6 | 692.3 | 693.0 | 693.1 | 694.6 | 695.0 | 697.5 |

Table VI summarizes the relative activities and average heavy naphtha yields obtained in the above examples.

TABLE VI
Data Summarization

| Catalyst | Composition, wt. percent | | | Relative activity | Heavy naphtha wt. percent |
|---|---|---|---|---|---|
| | $UO_2$ | CoO | $MoO_3$ | | |
| A | 0 | 2.5 | 10.0 | 1.00 | 59.4 |
| B | 2.5 | 0 | 10.0 | 1.00 | 60.5 |
| C | 2.5 | 2.5 | 10.0 | 1.18 | 58.1 |
| D | 1.08 | 2.5 | 10.0 | 1.30 | 58.5 |

The above data show that the embodiments of the catalytic composition of the present invention are improved catalysts for hydrocracking. Their use for hydrocracking the feedstock described in Table I resulted in either improved catalytic activity or possible minor improvements of the yield of heavy naphtha.

EXAMPLE V

Portions of the above Catalysts A and D were used to disproportionate toluene. Disproportionation was carried out at a pressure of 300 p.s.i.g., a temperature of about 950° F., an WHSV of 5.5 to 7.8 grams of toluene per hour per gram of catalyst, and a hydrogen-to-oil ratio of 18,000 to 21,000 s.c.f.b. Equipment similar to that employed for the hydrocracking tests was used for these disproportionation tests.

In each test, the catalyst was pretreated in the following manner. The reactor, containing the selected catalyst, was pressured up to 300 p.s.i.g. at 500° F. with a hydrogen-sulfide-hydrogen gas mix (8 volume percent hydrogen sulfide). Then the catalyst was pretreated with the gas mix for 2 hours at a gas flow rate of about 2 s.c.f.h. The temperature was raised to 750° F. during the first hour and held at 750° F. during the second hour. Then the reactor was bottled up at 300 p.s.i.g. in an atmosphere of the gas mix and held over the weekend under these conditions. Following this weekend hold, flowing hydrogen was introduced into the reactor and toluene feed was then started. During the first two hours on test, the temperature was raised from 750° F. to 950° F. and the 950° F. temperature was maintained for the remainder of the four-day test. One-half-hour product samples were obtained at 24-hour intervals and disproportionation rate constants were calculated from the resulting data through the use of the following equation:

$$k_D = 2 \times WHSV \times \left[ \frac{1}{\sqrt{T-x}} - \frac{1}{\sqrt{T}} \right]$$

where $k_D$ is the rate constant for disproportionation,
$T = 0.594 \, (1-y)$,
$y$ = weight fraction of light ends produced ($C_1$–$C_6$), and
$x$ = weight fraction of aromatic product.

Adjustments were made in temperature to 950° F. using an activation energy of 16 kilocalories per gram-mole and in hydrogen partial pressure to 300 p.s.i.a.

The results of these disproportionation tests are summarized in Table VII.

TABLE VII

Disproportionation Results

| Catalyst: | Rate constant | $C_1-C_6$ saturates, wt. percent at 35 percent conversion |
|---|---|---|
| A | 8.6 | 2.43 |
| D | 8.6 | 2.58 |

These results indicate that an embodiment of the catalytic composition of the present invention is a suitable catalyst for the disproportionation of aromatic hydrocarbons. The presence of uranium in the catalyst has had no detrimental effect upon disproportionation activity of the catalyst. The uranium-exchanged catalyst shows as much activity for disproportionation as does the reference catalyst, Catalyst A, which contains ultrastable, large-pore crystalline aluminosilicate material.

The above examples clearly demonstrate a superior catalytic composition for use in the conversion of petroleum hydrocarbon fractions and suitable processes employing this catalytic composition.

What is claimed is:

1. A catalytic composition for the conversion of petroleum hydrocarbons, which catalytic composition comprises a hydrogenation component on a co-catalytic acidic cracking support, said hydrogenation component comprising a member selected from the group consisting of the metals, the oxides, the sulfides, and mixtures thereof of a member selected from the group consisting of (1) uranium and a Group VI–B metal of the Periodic Table of Elements, (2) A Group VI–B metal and a Group VIII metal of the Periodic Table of Elements, and (3) uranium, a Group VI–B metal, and a Group VIII metal, said acidic cracking support comprising a large-pore crystalline aluminosilicate material and a silica-alumina cracking catalyst, said large-pore crystalline aluminosilicate material being a member selected from the group consisting of uranium-exchanged X-type aluminosilicate material, uranium-exchanged Y-type aluminosilicate material, uranium-exchanged L-type aluminosilicate material, and ultrastable, large-pore crystalline aluminosilicate material, said ultrastable, large-pore crystalline aluminosilicate material being characterized by a maximum cubic unit cell dimension of 24.55 A., hydroxyl infrared bands near 3700 cm.$^{-1}$ and near 3625 cm.$^{-1}$, and an alkali metal content that is less than 1 weight percent, and said catalytic composition being characterized by the presence of at least some uranium in its composite.

2. The catalytic composition of claim 1 wherein said large-pore crystalline aluminosilicate material is suspended in the porous matrix of said silica-alumina cracking catalyst.

3. The catalytic composition of claim 1 wherein said large-pore crystalline aluminosilicate material is present in an amount within the range of about 5 weight percent to about 50 weight percent, based upon the weight of said cracking support, said uranium and said Group VI–B metal are present in a combined amount within the range of about 1 weight percent to about 25 weight percent, based upon the total weight of said catalytic composition, the uranium being calculated as $UO_2$ and the Group VI–B metal being calculated as its oxide, said $UO_2$ being present in an amount of at least 0.5 weight percent, and said Group VIII metal is present in an amount within the range of about 1 weight percent to about 10 weight percent, based upon the total weight of said catalytic composition, said Group VIII metal being calculated as its oxide.

4. A process for the conversion of a petroleum hydrocarbon fraction which boils above about 350° F., which process comprises contacting the catalytic composition of claim 1 in a hydrocarbon-conversion reaction zone with a hydrogen-affording gas and said petroleum hydrocarbon fraction under hydrocarbon-conversion conditions, said conditions comprising a pressure of at least 100 p.s.i.g., an average catalyst bed temperature of about 650° F. to about 1,100° F., a hydrogen-to-oil ratio of about 1,000 s.c.f.b., to about 50,000 s.c.f.b., and a WHSV of at least 0.1 weight unit of hydrocarbon per hour per weight unit of catalyst.

5. A process for the conversion of a petroleum hydrocarbon fraction which boils above about 350° F., which process comprises contacting the catalytic composition of claim 2 in a hydrocarbon-conversion reaction zone with a hydrogen-affording gas and said petroleum hydrocarbon fraction under hydrocarbon-conversion conditions, said conditions comprising a pressure of at least 100 p.s.i.g., an average catalyst bed temperature of about 650° F. to about 1,100° F., a hydrogen-to-oil ratio of about 1,000 s.c.f.b., to about 50,000 s.c.f.b., and a WHSV of at least 0.1 weight unit of hydrocarbon per hour per weight unit of catalyst 6. The catalytic composition of claim 2 wherein said large-pore crystalline aluminosilicate material is present in an amount within the range of about 5 weight percent to about 50 weight percent, based upon the weight of said cracking support, said uranium and said Group VI–B metal are present in a combined amount within the range of about 1 weight percent to about 25 weight percent, based upon the total weight of said catalytic composition, the uranium being calculated as $UO_2$ and the Group VI–B metal being calculated as its oxide, said $UO_2$ being present in an amount of at least 0.5 weight percent, and said Group VIII metal is present in an amount within the range of about 1 weight percent to about 10 weight percent, based upon the total weight of said catalytic composition, said Group VIII metal being calculated as its oxide.

7. The catalytic composition of claim 6 wherein said Group VI–B metal is molybdenum and its amount is calculated as $MoO_3$ and said Group VIII metal is nickel and its amount is calculated as NiO.

8. The catalytic composition of claim 6 wherein said Group VI–B metal is molybdenum and its amount is calculated as $MoO_3$ and said Group VIII metal is cobalt and its amount is calculated as CoO.

9. A process for the hydrocracking of a petroleum hydrocarbon fraction having an initial boiling point of at least 350° F., which process comprises contacting the catalytic composition of claim 6 in a hydrocracking reaction zone with a hydrogen-affording gas and said petroleum hydrocarbon fraction under hydrocracking reaction conditions, said conditions comprising an average catalyst bed temperature in the range of about 650° F. to about 850° F., a hydrogen partial pressure within the range of about 675 p.s.i.g. to about 3,970 p.s.i.g., a total hydrocracking pressure within the range of about 700 p.s.i.g. to about 4,000 p.s.i.g., an LHSV within the range of about 0.5 to about 10 volumes of hydrocarbon per hour per volume of catalyst, and a hydrogen-to-oil ratio of at least 5,000 s.c.f.b.

10. A process for the disproportionation of a petroleum hydrocarbon stream which contains single-ring aromatic hydrocarbons which boil below about 650° F., which process comprises contacting the catalytic composition of claim 6 in a disproportionation reaction zone with a hydrogen-affording gas and said petroleum hydrocarbon stream under disproportionation reaction conditions, said conditions comprising a temperature within the range of about 700° F. to about 1,100° F., a pressure within the range of about 100 p.s.i.g. to about 1,000 p.s.i.g., a WHSV within the range of about 0.1 to about 20 weight units of hydrocarbon per hour per weight unit of catalyst, and a hydrogen-to-oil ratio within the range of about 1,000 s.c.f.b. to about 50,000 s.c.f.b.

11. A process for the hydrocracking of a petroleum hydrocarbon fraction having an initial boiling point of at least 350° F., which process comprises contacting the catalytic composition of claim 8 in a hydrocracking reaction zone with a hydrogen-affording gas and said petroleum hydrocarbon fraction under hydrocracking reaction conditions, said conditions comprising an average catalyst bed temperature in the range of about 650° F. to about 850° F., a hydrogen partial pressure within the range of about 675 p.s.i.g. to about 3,970 p.s.i.g., a total hydrocracking pressure within the range of about 700 p.s.i.g. to about 4,000 p.s.i.g., and LHSV within the range of about 0.5 to about 10 volumes of hydrocarbon per hour per volume of catalyst, and a hydrogen-to-oil ratio of at least 5,000 s.c.f.b.

12. A process for the disproportionation of a petroleum hydrocarbon stream which contains single-ring aromatic hydrocarbons which boil below about 650° F., which process comprises contacting the catalytic composition of claim 8 in a disproportionation reaction zone with a hydrogen-affording gas and said petroleum hydrocarbon stream under disproportionation reaction conditions, said conditions comprising a temperature within the range of about 700° F. to about 1,100° F., a pressure within the range of about 100 p.s.i.g. to about 1,000 p.s.i.g., a WHSV within the range of about 0.1 to about 20 weight units of hydrocarbon per hour per weight unit of catalyst, and a hydrogen-to-oil ratio within the range of about 1,000 s.c.f.b. to about 50,000 s.c.f.b.

13. The process of claim 9 wherein said hydrocracking reaction conditions comprise an average catalyst bed temperature in the range of about 680° F. to about 800° F., a total hydrocracking pressure within the range of about 1,000 p.s.i.g. to about 1,800 p.s.i.g., and LHSV within the range of about 1 to about 5 volumes of hydrocarbon per hour per volume of catalyst, and a hydrogen-to-oil ratio of about 8,000 s.c.f.b. to about 15,000 s.c.f.b.

14. The process of claim 10 wherein said disproportionation conditions comprise a temperature within the range of about 850° F. to about 1,000° F., a pressure within the range of about 200 p.s.i.g. to about 500 p.s.i.g., a WHSV within the range of about 1 to about 10 weight units of hydrocarbon per hour per weight unit of catalyst, and a hydrogen-to-oil ratio within the range of about 5,000 s.c.f.b. to about 30,000 s.c.f.b.

15. The process of claim 11 wherein said hydrocracking reaction conditions comprise an average catalyst bed temperature in the range of about 680° F. to about 800° F., a total hydrocracking pressure within the range of about 1,000 p.s.i.g. to about 1,800 p.s.i.g., an LHSV within the range of about 1 to about 5 volumes of hydrocarbon per hour per volume of catalyst, and a hydrogen-to-oil ratio of about 8,000 s.c.f.b. to about 15,000 s.c.f.b.

16. The process of claim 12 wherein said disproportionation conditions comprise a temperature within the range of about 850° F. to about 1,000° F., a pressure within the range of about 200 p.s.i.g. to about 500 p.s.i.g., a WHSV within the range of about 1 to about 10 weight units of hydrocarbon per hour per weight unit of catalyst, and a hydrogen-to-oil ratio within the range of about 5,000 s.c.f.b. to about 30,000 s.c.f.b.

17. The process of claim 11 wherein said petroleum hydrocarbon fraction contains at least 20 p.p.m. nitrogen.

18. The process of claim 11 wherein said maximum hydrogen-to-oil ratio is 20,000 s.c.f.b.

19. The process of claim 18 wherein said petroleum hydrocarbon fraction contains at least 20 p.p.m. nitrogen.

References Cited
UNITED STATES PATENTS

| | | | |
|---|---|---|---|
| 1,728,732 | 9/1925 | Jaegar | 23—113 |
| 3,431,196 | 3/1969 | Dobres et al. | 252—455 |
| 3,425,956 | 2/1969 | Baker et al. | 252—455 |

CURTIS R. DAVIS, Primary Examiner

U.S. Cl. X.R.

252—455 Z; 260—672 T

UNITED STATES PATENT OFFICE
CERTIFICATE OF CORRECTION

PO-1050 (5/69)

Patent No. 3,650,945      Dated   March 21, 1972

Inventor(s)   Ralph J. Bertolacini and Louis C. Gutberlet

It is certified that error appears in the above-identified patent and that said Letters Patent are hereby corrected as shown below:

Column 5, line 67, "hydrogen" should be --hydrogel--.

Column 6, line 11, "$MoO_2$" should be --$MoO_3$--.

Column 7, line 11, "materials" should be --material--.

Column 11, line 11, "line" should be --lines--.

Column 12, in equation at line 45, "$(\frac{1}{T_o} - \frac{1}{T})_2$" should be --$(\frac{1}{T_o} - \frac{1}{T})^2$--.

Column 19, line 11, "and LHSV" should be --an LHSV--.

Column 19, line 35, "and LHSV" should be --an LHSV--.

Signed and sealed this 3rd day of October 1972.

(SEAL)
Attest:

EDWARD M. FLETCHER, JR.
Attesting Officer

ROBERT GOTTSCHALK
Commissioner of Patents